United States Patent
Sohn et al.

(10) Patent No.: US 8,467,334 B2
(45) Date of Patent: Jun. 18, 2013

(54) MULTIPLE-INPUT MULTIPLE-OUTPUT (MIMO) COMMUNICATION METHOD AND APPARATUS USING THE SAME

(75) Inventors: Ill Soo Sohn, Seoul (KR); Byong Ok Lee, Bucheon-si (KR); Won Mu Lee, Seoul (KR); Kwang Bok Lee, Seoul (KR); Sung Jin Kim, Suwon-si (KR); Goochul Chung, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1373 days.

(21) Appl. No.: 12/166,724

(22) Filed: Jul. 2, 2008

(65) Prior Publication Data

US 2009/0034427 A1 Feb. 5, 2009

(30) Foreign Application Priority Data

Jul. 31, 2007 (KR) .......................... 10-2007-0076964

(51) Int. Cl.
 *H04W 4/00* (2009.01)
(52) U.S. Cl.
 USPC .......................................................... 370/328
(58) Field of Classification Search
 USPC .......................................................... 370/328
 See application file for complete search history.

(56) References Cited

U.S. PATENT DOCUMENTS

| | | | |
|---|---|---|---|
| 7,403,748 B1* | 7/2008 | Keskitalo et al. | 455/101 |
| 2005/0101259 A1* | 5/2005 | Tong et al. | 455/69 |
| 2006/0039493 A1* | 2/2006 | Mukkavilli et al. | 375/267 |
| 2006/0105767 A1 | 5/2006 | Kim et al. | |
| 2006/0116155 A1 | 6/2006 | Medvedev et al. | |
| 2006/0203891 A1 | 9/2006 | Sampath et al. | |
| 2006/0286974 A1 | 12/2006 | Gore et al. | |
| 2007/0280116 A1* | 12/2007 | Wang et al. | 370/236 |
| 2008/0013610 A1* | 1/2008 | Varadarajan et al. | 375/221 |
| 2008/0075058 A1* | 3/2008 | Mundarath et al. | 370/342 |
| 2008/0076370 A1* | 3/2008 | Kotecha et al. | 455/187.1 |
| 2008/0186212 A1* | 8/2008 | Clerckx et al. | 341/55 |

FOREIGN PATENT DOCUMENTS

| | | |
|---|---|---|
| KR | 1020050029443 A | 3/2005 |
| KR | 1020060110721 A | 10/2006 |

* cited by examiner

*Primary Examiner* — Mark Rinehart
*Assistant Examiner* — Angel Brockman
(74) *Attorney, Agent, or Firm* — NSIP Law (57) ABSTRACT

A multiple-input multiple-output (MIMO) communication method and apparatus are provided. A MIMO communication apparatus includes a selected beamforming vector determining unit to determine a selected beamforming vector corresponding to a selected user, a performance information generating unit to generate performance information corresponding to where a non-selected beamforming vector is allocated to a non-selected user, and an additional beamforming vector selecting unit to select an additional beamforming vector corresponding to the non-selected user based on the performance information.

18 Claims, 5 Drawing Sheets

MULTIPLE-INPUT MULTIPLE-OUTPUT (MIMO) COMMUNICATION METHOD AND APPARATUS USING THE SAME

CROSS-REFERENCE TO RELATED APPLICATIONS

This application claims the benefit under 35 U.S.C. §119(a) of a Korean Patent Application No. 2007-0076964, filed on Jul. 31, 2007, in the Korean Intellectual Property Office, the disclosure of which is incorporated herein by reference in its entirety. The invention disclosed herein was made as a result of activities undertaken within the scope of a joint research agreement between Samsung Electronics Co., Ltd., and Seoul National University Industry Foundation.

TECHNICAL FIELD

The following description relates to a communication system, and more particularly, to a multiple-input multiple-output (MIMO) communication method for improving a data transmission rate and a MIMO communication apparatus and/or system using the same.

BACKGROUND

With the rapid development in radio communication technology, various types of services such as voice communication, video communication, data communication, instant messaging, viewing a movie, a web service, a game, and the like are being provided. Users of these services demand abilities to transmit a large amount of data quickly while maintaining high quality.

In order to obtain a high transmission speed, there has been an active research on technology that may improve the transmission speed by installing multiple antennas in a base station. With the communication technology using multiple antennas, a diversity gain may be obtained from a plurality of radio channels that are formed between the multiple antennas. Multiple antennas may be provided between the base station and a terminal.

Multi-user diversity technology is a communication scheme that may concentrate data transmission on only a limited number of terminals with an excellent radio channel environment between a base station and the terminals, from among a plurality of terminals that exist in a cell-coverage of the base station, so as to improve a data transmission rate.

Accordingly, researches are being pursued with respect to a multi-user Multiple-Input Multiple-Output (MIMO) technology by combining teachings from a multi-user diversity technology and a MIMO communication technology. According to the multi-user MIMO technology, a base station may transmit data to multiple users via multiple antennas. Thus, a multi-user gain and a multiple antenna gain may be obtained.

However, interference may occur between multiple users when using the multi-user MIMO technology, which in turn may reduce the data transmission rate.

In order to improve the data transmission rate, a beamforming scheme may be performed for only particular users. Where data is transmitted to the particular users according to the scheme, the interference between the multiple users may be reduced.

However, the scheme of performing beamforming for only the particular users may cause other difficulties. For example, where it is assumed that a total of four users exist and only two users are selected as a beamforming target, two beamforming vectors corresponding to the selected two users may be selected, and beamforming may be performed for the selected two users based on the selected two beamforming vectors. In this case, unselected beamforming vectors may be wasted and thus the multi-user gain may be reduced. Since only beamforming vectors corresponding to particular users that are selected from a plurality of beamforming vectors are used for beamforming, the unselected beamforming vectors may reduce the efficiency of the system.

Accordingly, there is a need for a MIMO communication system and method that increases a multi-user gain by applying unselected beamforming vectors for beamforming.

SUMMARY

In one general aspect, a multiple-input multiple-output (MIMO) communication apparatus includes a selected beamforming vector determining unit to determine a selected beamforming vector corresponding to a selected user, a performance information generating unit to generate performance information corresponding to where a non-selected beamforming vector is allocated to a non-selected user, and an additional beamforming vector selecting unit to select an additional beamforming vector corresponding to the non-selected user based on the performance information.

The selected beamforming vector determining unit may determine the selected beam forming vector based on channel quality information that is fed back from a plurality of users.

The performance information generating unit may generate the performance information based on the channel quality information.

The performance information generating unit may include a channel vector estimating unit to estimate a channel vector corresponding to the non-selected user based on the channel quality information, and a performance information calculating unit to calculate the performance information based on the channel vector.

The performance information may include information associated with at least one of a signal-to-interference and noise ratio (SINR) of the non-selected user and a data transmission rate for the plurality of users.

The additional beamforming vector selecting unit may select the additional beamforming vector to maximize at least one of the SINR and the data transmission rate.

The selected beamforming vector determining unit may select the selected user according to a Per-User Unitary Rate Control (PU2RC) scheme to determine the selected beamforming vector.

The selected beamforming vector determining unit may determine the selected beamforming vector based on a sum of data transmission rates.

The apparatus may further comprise a signal transmitter to transmit a transmission signal to the selected user and the non-selected user, wherein the transmission signal is generated from a data stream.

In another general aspect, a MIMO communication method includes determining a selected beamforming vector corresponding to a selected user, generating performance information corresponding to where a non-selected beamforming vector is allocated to a non-selected user, and selecting an additional beamforming vector corresponding to the non-selected user according to the performance information.

The determining of the selected beamforming vector may comprise determining the selected beamforming vector based on channel quality information that is fed back from a plurality of users.

The generating of the performance information may comprise generating the performance information based on the channel quality information.

In still another general aspect, there is provided a MIMO communication apparatus and method that allocates a non-selected beamforming vector to a non-selected user based on fed back channel quality information so as to maximize a data transmission rate.

In still another general aspect, there is provided a MIMO communication apparatus and method that allocates an optimized beamforming vector to a non-selected user based on channel quality information so as to effectively use a beamforming vector.

In still another general aspect, there is provided a MIMO communication apparatus and method that selects an additional beamforming vector based on performance information. The selected additional beamforming vector may improve a multi-user gain and reduce side effects.

In still another general aspect, there is provided a MIMO communication apparatus and method that estimates a channel vector based on channel quality information and selects an additional beamforming vector based on the estimated channel vector. The selected additional beamforming vector may more effectively allocate a non-selected beamforming vector to a non-selected user.

Other features will become apparent to those skilled in the art from the following detailed description, which, taken in conjunction with the attached drawings, discloses exemplary embodiments of the invention

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
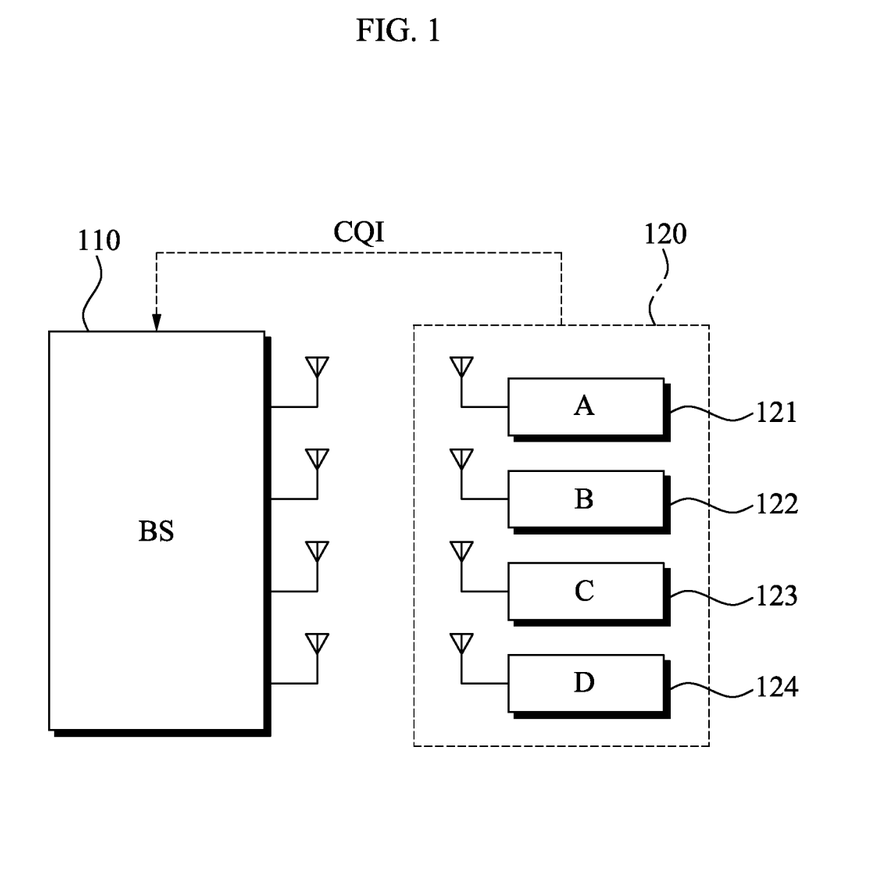
FIG. 1 is a configuration diagram illustrating a base station for use in a Multiple-Input Multiple-Output (MIMO) communication system, and terminals of multiple users according to an exemplary embodiment.

FIG. 1 illustrates a base station 110 for use in a communication system such as a multiple-input multiple-output (MIMO) communication system, and terminals 121, 122, 123, and 124 of multiple users 120 according to an exemplary embodiment.

As illustrated in FIG. 1, a plurality of antennas may be installed in the base station 110 and the terminals 121, 122, 123, and 124 may correspond to four users A, B, C, and D, respectively.

The base station 110 or the terminals 121, 122, 123, and 124 may store at least one precoding matrix. The precoding matrix may include a plurality of beamforming vectors. The plurality of beamforming vectors may be column vectors or row vectors of the precoding matrix.

A plurality of radio channels may be formed between the plurality of antennas installed in the base station 110 and the terminals 121, 122, 123, and 124 corresponding to the users A, B, C, and D. The base station 110 may transmit a pilot signal to each of the terminals 121, 122, 123, and 124. Each of the terminals 121, 122, 123, and 124 may receive the pilot signal and feed back information associated with the radio channels to the base station 110.

The information associated with the radio channels may include channel quality information. The channel quality information may include information associated with a beamforming vector preferred by each of the terminals 121, 122, 123, and 124.

For example, the base station 110 or each of the terminals 121, 122, 123, and 124 may store precoding matrices $C_1$, $C_2$, and $C_3$. The precoding matrix $C_1$ may be $[v_{1,1}\ v_{1,2}\ v_{1,3}\ v_{1,4}]$, $C_2$ may be $[v_{2,1}\ v_{2,2}\ v_{2,3}\ v_{2,4}]$, and $C_3$ may be $[v_{3,1}\ v_{3,2}\ v_{3,3}\ v_{3,4}]$. v included in the precoding matrices $C_1$, $C_2$, and $C_3$ may be beamforming vectors and column vectors. Four beamforming vectors included in the precoding matrix $C_1$ may have the size of '1' and have orthogonality. Similarly, four beamforming vectors included in each of the precoding matrices $C_2$ and $C_3$ may have the size of '1' and have orthogonality.

Each of the terminals 121, 122, 123, and 124 that receive the pilot signal from the base station 110 may determine a preferred beamforming vector. For example, the terminal 121 of the user A may determine $v_{1,1}$ as its own preferred beamforming vector. The terminal 122 the user B may determine $v_{1,2}$ as its own preferred beamforming vector. The terminal 123 of the user C may determine $v_{2,4}$ as its own preferred beamforming vector. The terminal 124 of the user D may determine $v_{3,3}$ as its own preferred beamforming vector.

Each of the terminals 121, 122, 123, and 124 may feed back to the base station 110 channel quality information that includes information associated with its own preferred beamforming vector. The channel quality information may include index information of the preferred beamforming vector, information associated with a signal-to-interference and noise ratio (SINR) of the preferred beamforming vector, or channel direction information. According to an aspect, the channel quality information may include index information of the preferred beamforming vector in addition to the SINR of the preferred beamforming vector. The base station 110 may verify the preferred beamforming vector and the SINR of the the preferred beamforming vector based on the channel quality information.

The base station 110 may select at least one user from the plurality of users A, B, C, and D. In this case, the base station 110 may determine a selected beamforming vector corresponding to the selected user based on channel quality information that is fed back from the plurality of users A, B, C, and D. The base station 110 may select the selected user according to a Per-User Unitary Rate Control (PU2RC) scheme to thereby determine the selected beamforming vector. The base station 110 may determine the selected beamforming vector based on a sum of data transmission rates.

In the above-described example, the base station 110 may determine, as the selected user, the users A and B, the user C, or the user D. The base station 110 may determine the selected user according to various types of criteria. For example, the base station 110 may determine the selected user based on whether beamforming vectors preferred by the users A, B, C, and D belong to the same precoding matrix. Since the users A and B select $v_{1,1}$ and $v_{1,2}$ of the precoding matrix $C_1$ as the preferred beamforming vectors, the users A and B may be selected as the selected user.

According to an aspect, the base station 110 may determine the selected user based on the sum of data transmission rates.

For example, where the base station 110 determines, as the selected user, the users A and B, the user C, or the user D, and the sums of data transmission rates are R1, R2, and R3 respectively, the base station 110 may determine the selected user based on a sum of data transmission rates with a maximum value. Where R1 is the largest value among R1, R2, and R3, the base station 110 may determine the users A and B as the selected user. In this case, $v_{1,1}$ and $v_{1,2}$ may be determined as selected beamforming vectors corresponding to the selected users A and B.

Figure 2:
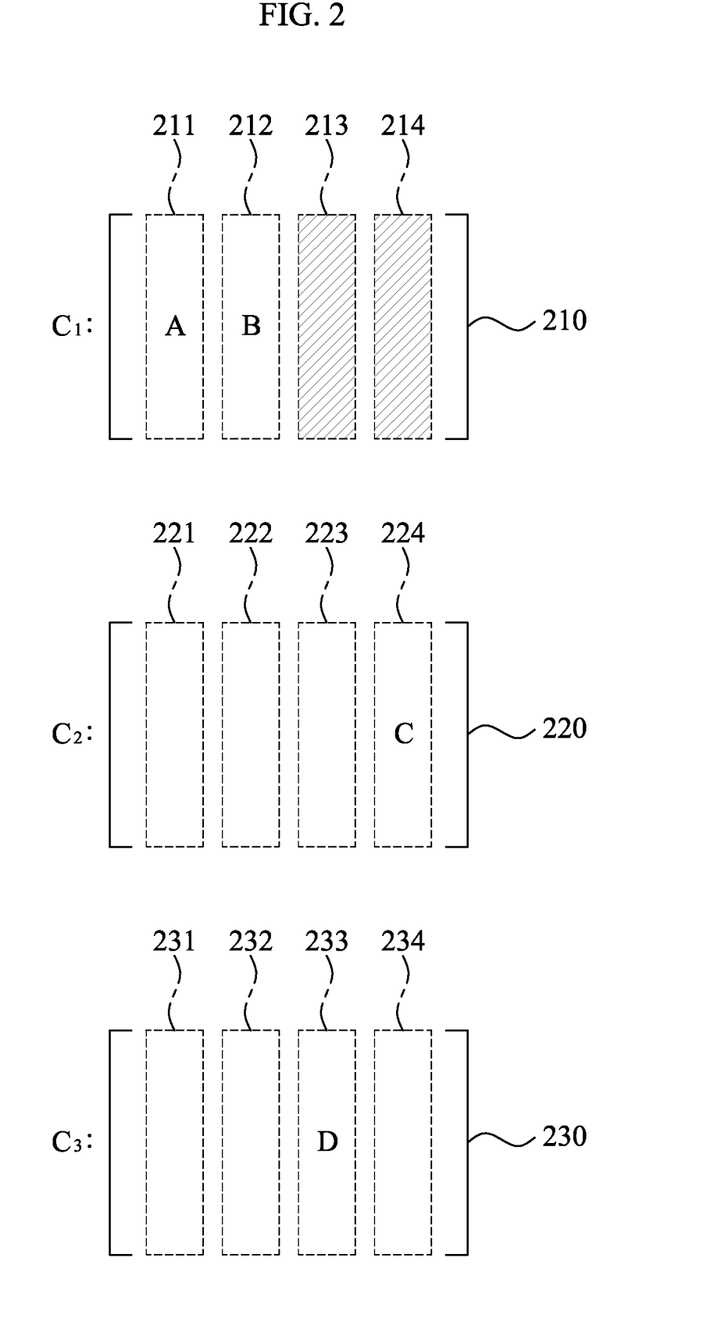
FIG. 2 is a diagram illustrating an exemplary preceding matrix including a plurality of beamforming vectors.

FIG. 2 illustrates an exemplary precoding matrix including a plurality of beamforming vectors.

As illustrated in FIG. 2, precoding matrices $C_1$, $C_2$, and $C_3$ 210, 220, and 230 may be stored in a base station or a terminal. The precoding matrix $C_1$ 210 may include four beamforming vectors 211, 212, 213, and 214. The precoding matrix $C_2$ 220 may include four beamforming vectors 221, 222, 223, and 224. The precoding matrix $C_3$ 230 may include four beamforming vectors 231, 232, 233, and 234.

With reference to FIG. 1, the users A and B may determine the beamforming vectors 211 and 212 as their own preferred beamforming vectors respectively. The users C and D may determine the beamforming vectors 224 and 233 as their own preferred beamforming vectors, respectively. Where the users A and B are determined as the selected users, the beamforming vectors 211 and 212 may be determined as the selected beamforming vectors.

The users C and D that are not determined as the selected users among the users A, B, C, and D may be determined as unselected users. In this case, the beamforming vectors 213 and 214 of the precoding matrix $C_1$ 210 may be determined as unselected beamforming vectors. Where the unselected beamforming vectors 213 and 214 are not used to perform beamforming, the beamforming vectors 213 and 214 may be wasted. As the size of the precoding matrix $C_1$ 210 increases, the waste may be increased.

Figure 3:
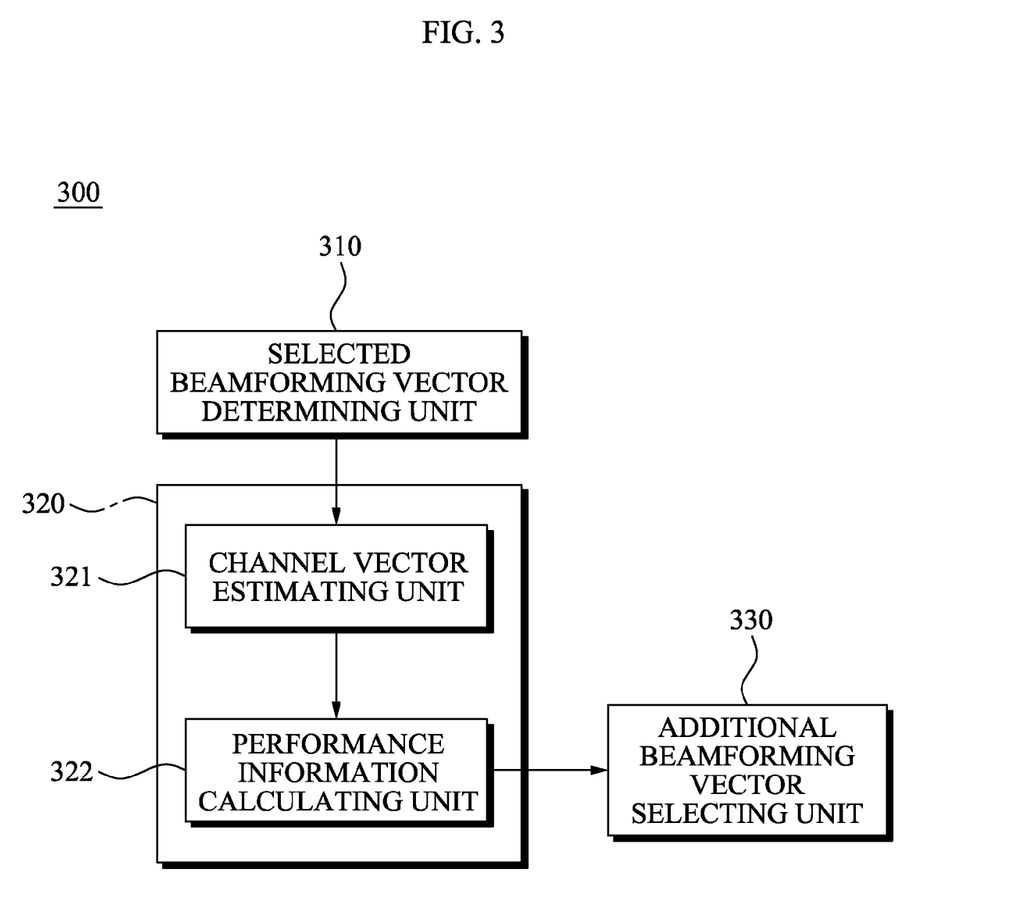
FIG. 3 is a block diagram illustrating an exemplary MIMO communication apparatus.

FIG. 3 illustrates an exemplary MIMO communication apparatus 300.

As illustrated in FIG. 3, the MIMO communication apparatus 300 may include a selected beamforming vector determining unit 310, a channel vector estimating unit 321, a performance information calculating unit 322, and an additional beamforming vector selecting unit 330.

The selected beamforming vector determining unit 310 may determine a selected beamforming vector corresponding to a selected user based on channel quality information that is fed back from a plurality of users. The selected beamforming vector determining unit 310 may select the selected user according to a PU2RC scheme to thereby determine the selected beamforming vector. Also, the selected beamforming vector determining unit 310 may determine the selected beamforming vector based on a sum of data transmission rates. The selected beamforming vector determining unit 310 has been described above in detail with reference to FIGS. 1 and 2 and thus further description will be omitted here.

A performance information generating unit 320 may generate performance information corresponding to a case where a non-selected beamforming vector is allocated to a non-selected user, based on the channel quality information. Where two and more non-selected beamforming vectors exist, the performance information generating unit 320 may generate the performance information corresponding to a case where each of the non-selected beamforming vectors is allocated to the non-selected user.

According to an aspect, the performance information generating unit 320 may include the channel vector estimating unit 321 that may estimate a channel vector corresponding to the non-selected user based on the channel quality information, and may include the performance information calculating unit 322 that may calculate the performance information based on the channel vector.

The performance information may include information associated with at least one of an SINR of the non-selected user and a data transmission rate for the plurality of users.

For example, referring again to FIG. 2, where each of the non-selected beamforming vectors 213 and 214 is allocated to the non-selected user C, the performance information generating unit 320 may generate information associated with an SINR of the non-selected user C. The generated performance information may include the SINR of the non-selected user C of where the non-selected beamforming vector 213 is allocated to the non-selected user C, and the SINR of the non-selected user C of where the non-selected beamforming vector 214 is allocated to the non-selected user C. Where the non-selected beamforming vectors 213 and 214 are allocated to the non-selected user C, the performance information generating unit 320 may generate performance information that includes information associated with data transmission rates of all the users A, B, C, and D.

The channel vector estimating unit 321 may estimate the channel vector corresponding to the non-selected user based on the channel quality information. A radio channel may be formed between the base station and the non-selected user and the radio channel may be expressed as the channel vector. The channel vector may be estimated based on channel quality information that is fed back from the non-selected user.

The performance information calculating unit 322 may calculate the performance information based on the channel vector. For example, where the channel vector with respect to the channel between the non-selected user and the base station is calculated, the SINR of the non-selected user may be calculated based on the channel vector.

The operation of the channel vector estimating unit 321 and the performance information generating unit 322 will be described later with reference to FIG. 4.

The additional beamforming vector selecting unit 330 may select an additional beamforming vector corresponding to the non-selected user based on the performance information. The additional beamforming vector selecting unit 330 may select the additional beamforming vector to maximize the SINR.

Referring again to FIG. 2, performance information corresponding to a case where the non-selected beamforming vector 213 is allocated to the non-selected user C and where the non-selected beamforming vector 214 is allocated to the non-selected user C, may be generated. The performance information may include information associated with at least one of each SINR and data transmission rates for all the users A, B, C, and D. For example, where the non-selected beamforming vectors 213 and 214 are allocated to the non-selected user C, the SINRs of the non-selected user C may be 10 dB and 30 dB respectively. The additional beamforming vector selecting unit 330 may select, as the additional beamforming vector, the non-selected beamforming vector 214 with the SINR of 30 dB.

Although not illustrated in FIG. 3, the MIMO communication apparatus 300 may further include a signal transmitter (not shown) that may transmit a transmission signal to the selected user and the non-selected user. The transmission signal may be generated from the data stream.

Figure 4:
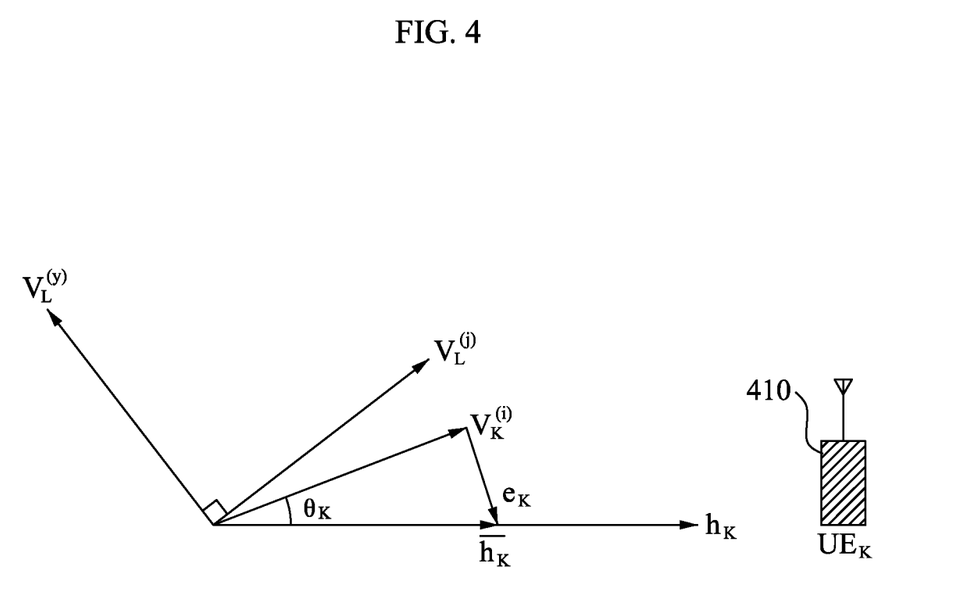
FIG. 4 is a diagram illustrating a selected beamforming vector and an unselected beamforming vector according to an exemplary embodiment.

FIG. 4 illustrates a selected beamforming vector and an unselected beamforming vector according to an exemplary embodiment.

Referring to FIG. 4, $h_k$ may be a channel vector of a channel formed between a non-selected user 410 and a base station. $v_k^{(i)}$ may be a preferred beamforming vector of the non-selected user 410 and may be identified based on channel quality information that is fed back from the non-selected user 410 to the base station. $v_L^{(y)}$ may be a selected beamforming vector corresponding to the selected user. $v_L^{(j)}$ may be a non-selected beamforming vector. $v_L^{(y)}$ and $v_L^{(j)}$ may be beamforming vectors included in the same preceding matrix. $v_k^{(i)}$, $v_L^{(y)}$, and $V_L^{(j)}$ may have a size of '1'. $\bar{h}_k$ may be a directional vector of $h_k$ that has the same direction as $h_k$ and has a size of '1'. $\theta_k$ may be an angle between the preferred beamforming vector $v_k^{(i)}$ of the non-selected user 410 and the channel vector. $e_k$ may be an error vector corresponding to the difference between $\bar{h}_k$ and $v_k^{(i)}$.

The selected beamforming vector $v_L^{(y)}$ may correspond to the selected user. The selected user may include at least one user. The non-selected beamforming vector $v_L^{(j)}$ may be a beamforming vector included in the preceding matrix that belongs to the selected beamforming vector $v_L^{(y)}$. Accordingly, $v_L^{(y)}$ and $v_L^{(j)}$ may be orthogonal to each other.

The channel vector $h_k$ may be represented by the following Equation 1:

$$h_k = \|h_k\|\bar{h}_k = \|h_k\|(v_k^{(i)} + e_k)^H \quad (1).$$

According to an aspect, the size of the channel vector $h_k$ may be estimated based on channel quality information $CQI_k$ that is fed back from the non-selected user 410.

The channel quality information $CQI_k$ fed back from the non-selected user 410 may be represented by the following Equation 2:

$$CQI_k = \frac{\frac{P}{M}|h_k v_k^{(i)}|^2}{\frac{P}{M}|h_k v_k^{(x)}|^2 + 1} \quad (2)$$

$$= \frac{\frac{P}{M}\|h_k\|^2|(v_k^{(i)})^H v_k^{(i)} + e_k^H v_k^{(i)}|^2}{\frac{P}{M}\|h_k\|^2 \sum_x |(v_k^{(i)})^H v_k^{(x)} + e_k^H v_k^{(x)}|^2 + 1},$$

where P is a power of a transmission signal, M is a number of antennas installed in a transmitting end or the base station, x is an index of a beamforming vector included in a preceding matrix of $v_k^{(i)}$, and $v_k^{(x)}$ are beamforming vectors included in the preceding matrix of $v_k^{(i)}$.

From Equation 2, the following Equation 3 may be deduced:

$$\|h_k\|^2 = \frac{CQI_k \frac{M}{P}}{|1 + e_k^H v_k^{(i)}|^2 - CQI_k \sum_x |e_k^H v_k^{(x)}|^2}. \quad (3)$$

Referring to Equation 3, the size of the channel vector corresponding to the non-selected user 410 may be represented by an equation that includes the channel quality information $CQI_k$ fed back from the non-selected user 410.

An SINR of the non-selected user 410 corresponding to where the non-selected beamforming vector $v_L^{(j)}$ is allocated to the non-selected user 410 may be represented by the following Equation 4:

$$SINR_k^{(j)} = \frac{\frac{P}{M}|h_k v_L^{(j)}|^2}{\frac{P}{M}\sum_y |h_k v_L^{(y)}|^2 + 1} \quad (4)$$

$$= \frac{\frac{P}{M}\|h_k\|^2|(v_k^{(i)})^H v_L^{(j)} + e_k^H v_L^{(j)}|^2}{\frac{P}{M}\|h_k\|^2 \sum_y |(v_k^{(i)})^H v_L^{(y)} + e_k^H v_L^{(y)}|^2 + 1}$$

$$= \frac{CQI_k |(v_k^{(i)})^H v_L^{(j)} + e_k^H v_L^{(j)}|^2}{CQI_k \sum_y |(v_k^{(i)})^H v_L^{(y)} + e_k^H v_L^{(y)}|^2 + |1 + e_k^H v_k^{(i)}|^2 - CQI_k \sum_x |e_k^H v_k^{(x)}|^2}.$$

Referring to Equation 4, the SINR of the non-selected user 410 corresponding to where the non-selected beamforming vector $v_L^{(j)}$ is allocated to the non-selected user 410 may be represented by an equation that includes the channel quality information $CQI_k$ fed back from the non-selected user 410. Since the base station is aware of $CQI_k$, $v_k^{(i)}$, $v_L^{(y)}$, $v_L^{(j)}$, and $v_k^{(x)}$, the range of the SINR of the non-selected user 410 corresponding to where the non-selected beamforming vector $v_L^{(j)}$ is allocated to the non-selected user 410, may be calculated.

The additional beamforming vector selecting unit 330 may select k to maximize the SINR. A beamforming vector corresponding to the selected k may be selected as the additional beamforming vector corresponding to the non-selected user 410.

The range of $\theta_k$ may be limited by the following Equation 5:

$$\theta_k \leq \frac{1}{2}\theta_{max}, \quad (5)$$

where $\theta_{max}$ is a maximum value of an angle between adjacent beamforming vectors.

In association with the error vector $e_k$, the following Equation 6 may be deduced from Equation 5:

$$0 \le \|e_k\| \le \sqrt{2\left(1-\cos\frac{\theta_{max}}{2}\right)}. \quad (6)$$

Since a random beamforming vector v has a size of '1', the following Equation 7 may be deduced from Equation 6:

$$|e_k^H v| \le \sqrt{2\left(1-\cos\frac{\theta_{max}}{2}\right)}. \quad (7)$$

By combining Equation 4 and Equation 7, the SINR may be expressed to belong to the range given by the following Equation 8:

$$SINR_k^{(j)} \ge \frac{CQI_k\left\{\max\left(|(v_k^{(i)})^H v_L^{(j)}| - \sqrt{2\left(1-\cos\frac{\theta_{max}}{2}\right)}, 0\right)\right\}^2}{CQI_k \sum_y \left\{|(v_k^{(i)})^H v_L^{(y)}| + \sqrt{2\left(1-\cos\frac{\theta_{max}}{2}\right)}\right\}^2 + \left(1+\sqrt{2\left(1-\cos\frac{\theta_{max}}{2}\right)}\right)^2}. \quad (8)$$

Where a significantly large number of bits of data are fed back from a plurality of users, $\theta_{max}$ may approache zero. In this case, the SINR of the non-selected user 410 may be represented by the following Equation 9:

$$SINR_k^{(j)} \cong \frac{CQI_k |(v_k^{(i)})^H v_L^{(j)}|^2}{CQI_k \sum_y |(v_k^{(i)})^H v_L^{(y)}|^2 + 1}. \quad (9)$$

Referring to Equation 9, the additional beamforming vector selecting unit 330 may select the additional beamforming vector and k to maximize the SINR. According to an aspect, since a non-selected beamforming vector is recycled, wasting of a beamforming vector may be prevented and a non-selected beamforming vector may be allocated to a non-selected user while maintaining good SINR.

Figure 5:
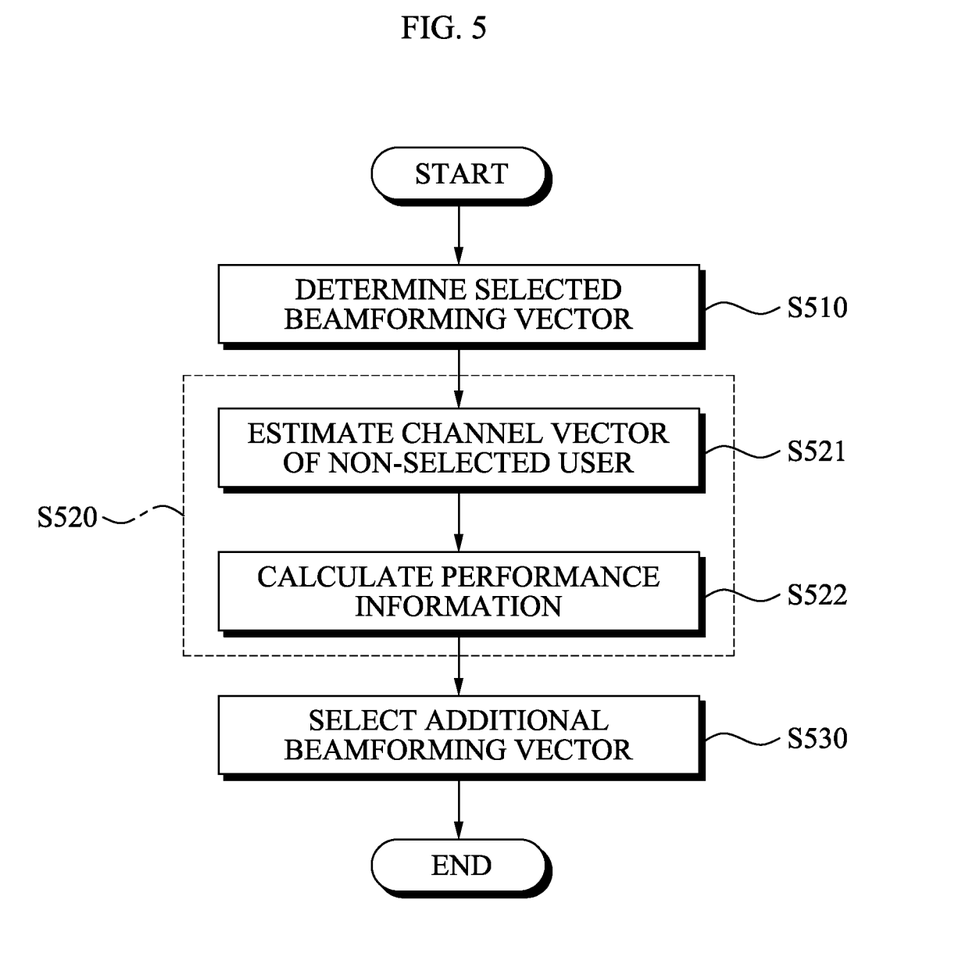
FIG. 5 is a flowchart illustrating an exemplary MIMO communication method.

FIG. 5 illustrates an exemplary MIMO communication method.

Referring to FIG. 5, in operation S510, the MIMO communication method includes determining a selected beamforming vector corresponding to a selected user based on channel quality information fed back from a plurality of users.

According to an aspect, operation S510 may include selecting the selected user according to a PU2RC scheme to thereby determine the selected beamforming vector.

According to another aspect, operation S510 may include determining the selected beamforming vector based on a sum of data transmission rates.

Performance information may include information associated with at least one of an SINR of a non-selected user and a data transmission rate for the plurality of users.

In operation S520, the MIMO communication method further includes generating performance information corresponding to where a non-selected beamforming vector is allocated to a non-selected user, based on the channel quality information.

According to an aspect, operation S520 may include operation S521 of estimating a channel vector corresponding to the non-selected user based on the channel quality information, and operation S522 of calculating the performance information based on the channel vector.

Where two and more non-selected beamforming vectors exist, operation S520 may include generating the performance information corresponding to where each of the non-selected beamforming vectors is allocated to the non-selected user.

In operation S530, the MIMO communication method further includes selecting an additional beamforming vector corresponding to the non-selected user based on the performance information. Operation S530 may include selecting the additional beamforming vector to maximize at least one of the SINR and the data transmission rate.

Although not illustrated in FIG. 5, the MIMO communication method may further include transmitting a transmission signal to the selected user and the non-selected user. The transmission signal may be generated from a data stream.

Descriptions not made with reference to FIG. 5 have been described above with reference to FIGS. 1 through 4 and thus further descriptions will be omitted herein.

The above-described exemplary MIMO communication methods may be recorded, or fixed in one or more non-transitory computer-readable media that includes program instructions to be implemented by a computer to case a processor to execute or perform the program instructions. The media may also include, independent or in combination with the program instructions, data files, data structures, and the like. Examples of non-transitory computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations described above.

While a certain communication apparatus has been described above, it is understood that such apparatus may be provided as a communication system comprising one or more components.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multiple-input multiple-output (MIMO)communication apparatus, comprising:
a selected beamforming vector determining unit configured to determine a selected beamforming vector corresponding to a selected user," a performance information generating unit configured to generate performance information corresponding to a non-selected beamforming vector allocated to a non-selected user," and an additional beamforming vector selecting unit configured to select an additional beamforming vector corresponding to the non-selected user based on the performance information, wherein the selected beamforming vector determining unit selects' the selected user according to a Per-User Unitary Rate Control (PU2RC) scheme to determine the selected beamforming vector.

2. The apparatus of claim 1, wherein the selected beamforming vector determining unit determines the selected beam forming vector based on channel quality information that is fed back from a plurality of users, and the performance information generating unit generates the performance information based on the channel quality information.

3. The apparatus of claim 2, wherein the performance information generating unit comprises:
   a channel vector estimating unit configured to estimate a channel vector corresponding to the non-selected user based on the channel quality information; and
   a performance information calculating unit configured to calculate the performance information based on the channel vector.

4. The apparatus of claim 2, wherein the performance information includes information associated with at least one of a signal-to-interference and noise ratio (SINR) of the non-selected user and a data transmission rate for the plurality of users.

5. The apparatus of claim 4, wherein the additional beamforming vector selecting unit selects the additional beamforming vector to maximize at least one of the SINR and the data transmission rate.

6. The apparatus of claim 1, wherein for two or more non-selected beamforming vectors, the performance information generating unit generates the performance information corresponding to each of the non-selected beamforming vectors being allocated to the non-selected user.

7. The apparatus of claim 1, wherein the selected beamforming vector determining unit determines the selected beamforming vector based on a sum of data transmission rates.

8. The apparatus of claim 1, further comprising:
   a signal transmitter configured to transmit a transmission signal to the selected user and the non-selected user, wherein the transmission signal is generated from a data stream.

9. A multiple-input multiple-output (MIMO) communication method, comprising:
   determining a selected beamforming vector corresponding to a selected user," generating performance information corresponding to a non-selected beamforming vector allocated to a non-selected user," and selecting an additional beamforming vector corresponding to the non-selected user based on the performance information, wherein determining the selected beamforming vector comprises selecting the selected user according to a Per-User Unitary Rate Control (PU2RC) scheme to determine the selected beamforming vector.

10. The method of claim 9, wherein the determining of the selected beamforming vector comprises determining the selected beamforming vector based on channel quality information that is fed back from a plurality of users, and the generating of the performance information comprises generating the performance information based on the channel quality information.

11. The method of claim 10, wherein the performance information includes information associated with at least one of a signal-to-interference and noise ratio (SINR) of the non-selected user and a data transmission rate for the plurality of users.

12. The method of claim 11, wherein the selecting of the additional beamforming vector comprises selecting the additional beamforming vector to maximize at least one of the SINR and the data transmission rate.

13. The method of claim 10, wherein the generating of the performance information comprises:
   estimating a channel vector corresponding to the non-selected user based on the channel quality information; and
   calculating the performance information based on the channel vector.

14. The method of claim 9, wherein for two or more non-selected beamforming vectors, the generating of the performance information comprises generating the performance information corresponding to each of the non-selected beamforming vectors being allocated to the non-selected user.

15. The method of claim 9, wherein the determining of the selected beamforming vector comprises determining the selected beamforming vector based on a sum of data transmission rates.

16. The method of claim 9, further comprising:
   transmitting a transmission signal to the selected user and the non-selected user, wherein the transmission signal is generated from a data stream.

17. A non-transitory computer-readable recording medium storing a program to implement a multiple-input multiple-output (MIMO) communication method, the program comprising instructions to case a computer to: determine a selected beamforming vector corresponding to a selected user," generate performance information corresponding to a non-selected beamforming vector allocated to a non-selected user," and select an additional beamforming vector corresponding to the non-selected user based on the performance information, wherein determining the selected beamforming vector comprises selecting the selected user according to a Per-User Unitary Rate Control (PU2RC) scheme to determine the selected beamforming vector.

18. The non-transitory computer-readable recording medium of claim 17, wherein the instruction to determine the selected beamforming vector comprises an instruction to determine the selected beamforming vector based on channel quality information that is fed back from a plurality of users, and the instruction to generate the performance information comprises an instruction to generate the performance information based on the channel quality information.

* * * * *